United States Patent
Takiura

[11] 3,891,372
[45] June 24, 1975

[54] APPARATUS FOR THE HIGH-PRESSURE CROSS-LINKING MOLDING OF POLYMERS

[75] Inventor: Mamoru Takiura, Kawasaki, Japan

[73] Assignee: Ikegai Tekko Kabushiki Kaisha, Tokyo, Japan

[22] Filed: Mar. 15, 1973

[21] Appl. No.: 341,783

Related U.S. Application Data

[63] Continuation-in-part of Ser. No. 206,030, Dec. 8, 1971, abandoned.

[30] Foreign Application Priority Data
Dec. 18, 1970 Japan............................ 45-113124
June 14, 1971 Japan............................ 46-42456

[52] U.S. Cl. ............... 425/244; 425/245; 425/376
[51] Int. Cl. ............................................... B29f 1/06
[58] Field of Search......... 264/176 R, 329; 425/4 C, 425/817 C, 242, 244, 245, 247, 448, 149, 146, 147, 205, 227, 376

[56] References Cited
UNITED STATES PATENTS

| | | | |
|---|---|---|---|
| 2,207,426 | 7/1940 | Bailey | 425/247 X |
| 2,890,491 | 6/1959 | Hendry | 425/247 X |
| 3,158,901 | 12/1964 | Westover | 425/378 X |
| 3,256,568 | 6/1966 | Stenger | 425/244 X |
| 3,485,905 | 12/1969 | Compa et al. | 425/205 X |
| 3,526,926 | 9/1970 | Reid | 425/149 |
| 3,619,329 | 11/1971 | Wright | 425/4 C X |
| 3,674,401 | 7/1972 | Annis, Jr. et al. | 425/244 |

FOREIGN PATENTS OR APPLICATIONS
1,007,053 4/1957 Germany ........................... 425/378

Primary Examiner—R. Spencer Annear
Assistant Examiner—Mark Rosenbaum
Attorney, Agent, or Firm—Woodhams, Blanchard and Flynn

[57] ABSTRACT

Moldings of cross-linked polymer are prepared by melting and kneading a mixture consisting of a polymer with cross-linking property and a cross-linking agent distributed uniformly therein within an extruder by applying a temperature and pressure that will not cause the cross-linking reaction, the thus melted and kneaded mixture is fed into a reaction chamber and the cross-linking reaction of said mixture is effected within said reaction chamber by applying a temperature and a pressure higher than the temperature and pressure of the extruder; and then the mixture is molded and cooled.

8 Claims, 15 Drawing Figures

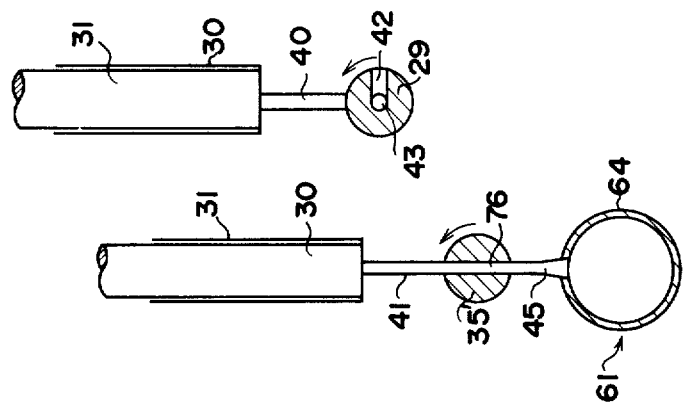
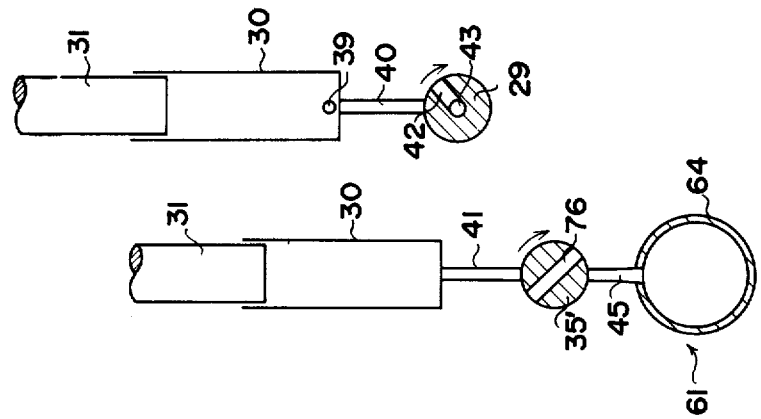
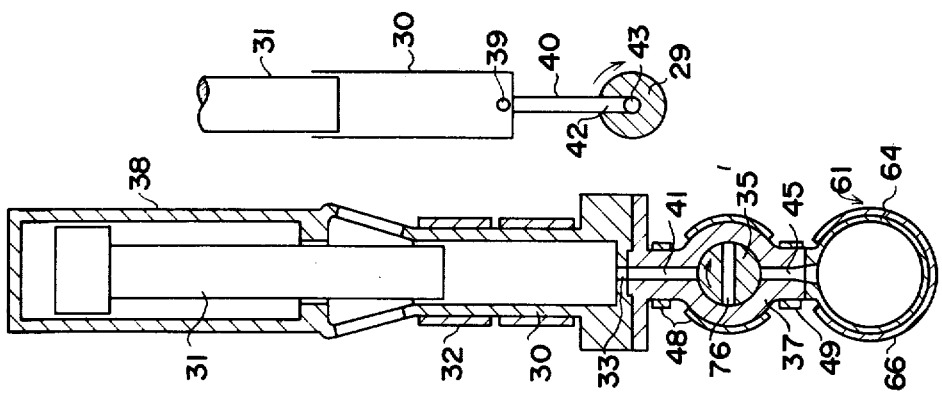

APPARATUS FOR THE HIGH-PRESSURE CROSS-LINKING MOLDING OF POLYMERS

CROSS-REFERENCE TO RELATED APPLICATION

This application is a continuation-in-part of my co-pending application Ser. No. 206,030, filed Dec. 8, 1971, now abandoned.

BACKGROUND OF THE INVENTION

1. Field of the Invention

This invention relates to an apparatus for the high-pressure cross-linking molding of high polymers having a cross-linking property, such as polyolefins.

2. Description of the Prior Art

The cross-linking of polyolefins, such as polyethylene, has heretofore been performed by preparing fine particles of polyethylene containing a cross-linking agent dispersed uniformly therein, molding said fine particles by the use of an extruder or the like, and then treating the resultant moldings to effect the cross-linking reaction.

The prior art procedures for effecting the cross-linking reaction include the high pressure steam method, the high temperature liquid method, covered lead cure method, W. R. Grace method, the radiant ray method, etc. But only the high pressure steam method and the W. R. Grace method have been put into practical use, for technical or economic reasons. The high pressure steam method is not fully satisfactory because it requires the use of a long and sturdy vulcanizing tube of the vertical type of the catenary type, thereby entailing an enormous cost of equipment, it hampers the efficient use of the extruder and if is difficult to produce moldings of uniform quality. The W. R. Grace method is also not completely satisfactory because its efficiency and workability are poor.

In addition to these methods, there is known a recently developed method of cross-linking called the Thomas Engel method. This method performs the cross-linking by mixing a cross-linking agent with the polymer within an extruder, feeding the resulting mixture into a pressure chamber and therein instantaneously applying a pressure of more than 2000 Kg/cm$^2$ to make sure that uniform dispersion of said cross-linking agent in the polymer can be effected without giving rise to the cross-linking reaction, and then passing the thus treated mixture through a die held at a temperature high enough to effect the cross-linking reaction. This method is characterized by the uniform distribution of the cross-linking agent within the polymer, but the cross-linking is effected by heating within a die.

All of the foregoing methods of cross-linking known to date are intended for effecting the cross-linking subsequent to or simultaneously with the molding of the polymer. These methods are based on the erroneous belief that a polymer which has previously undergone the cross-linking reaction gets heat-cured and becomes unsuitable for molding or extrusion. It is difficult to obtain stable moldings possessing uniform cross-linking by means of these prior methods.

SUMMARY OF THE INVENTION

The present invention is intended for eliminating the foregoing defects of the conventional methods.

Generally speaking, molecular motion becomes vigorous as the pressure is elevated to some extent and, as a result, the intermolecular distance becomes smaller. When the temperature is raised to some extent, simultaneously with elevating the pressure, by virtue of the synergistic effect of the higher temperature and the reduced intermolecular distance, the reaction speed is increased. In order to initiate the cross-linking reaction, the colliding molecules should possess more energy than their normal energy. This increased energy-regardless of whether it is molecular motive energy or the internal eneray-can be imparted to the polymer by elevating the pressure thereon.

The inventor has conducted the following experiments to study the effects of pressure and temperature, especially the pressure energy as mentioned above, on the reaction speed in the cross-linking reaction. In each experiment, a mixture, prepared by uniformly mixing 100 parts by weight of a low-density polyethylene (density: 0.92, melt index: 2.0), 1.25 parts by weight of dicumyl peroxide as the cross-linking agent and 0.5 part by weight of an antioxidant, was melted and kneaded with an extruder under the conditions that the temperature was lower than 130°C and the pressure was 100 Kg/cm$^2$, and then the molten mixture was introduced into a reaction chamber. In the experiments, various pressures, various temperatures and various reaction times were applied to the molten mixture in the reaction chamber. The results were as shown in the following table.

| pressure within the reaction chamber (Kg/cm$^2$) | time assigned for holding the pressure (sec) | temperature within the reaction chamber (°C) | gel content of polyethylene (wt. %) |
|---|---|---|---|
| 2000 | 50 | 163 | 61.48 |
| 2000 | 30 | 190 | 82.21 |
| 2000 | 20 | 200 | 84.31 |
| 2500 | 20 | 190 | 88.86 |
| 2500 | 20 | 200 | 93.60 |
| 3000 | 15 | 200 | 95.32 |
| 4000 | 10 | 200 | 96.62 |

As is clear from this table, a cross-linked polyethylene having a gel content of at least 70 wt. percent suitable for practical use can be obtained in no more than about 30 seconds when the temperature is higher than 180°C and the pressure is more than 2000 Kg/cm$^2$. In addition, it was confirmed that a polymer cross-linked as above was somewhat inferior to the pre-reaction polymer in rheological characteristics, but it possessed a sufficient fluidity at a temperature within a prescribed range and it could be molded satisfactorily by the use of a die.

Further, the moldings extruded from a die became hard when cooled, and the resulting molded products did not show fluidity even when subjected to heating thereafter.

The present invention successfully overcomes the abovementioned defects of the conventional methods by making use of these facts.

One object of the present invention is to provide an apparatus for molding a polymer containing a cross-linking agent distributed uniformly therein in advance, after effecting a cross-linking reaction, by employing a molding apparatus comprising an extruder, a reaction chamber and a molding head.

Another object of the present invention is to provide an apparatus for molding a polymer containing a cross-linking agent distributed uniformly therein in advance, in which the efficiency of the extruder is maintained for a long period of time without causing any impairment of its operation.

A further object of the present invention is to provide a molding apparatus which is capable of producing molded products consisting of a uniformly cross-linked polymer.

A still further object of the present invention is to provide a molding apparatus which is capable of producing molded products consisting of a uniformly cross-linked polymer, which apparatus does not require the use of a large-sized extruder or vulcanizing equipment.

Still another object of the present invention is to provide a molding apparatus in which a mixture consisting of a high polymer and a cross-linking agent distributed uniformly therein is kneaded while applying such temperature and pressure as will not give rise to the cross-linking reaction; and subsequently effecting the cross-linking reaction of the thus kneaded mixture by applying a temperature and a pressure higher than the temperature an the pressure employed during the kneading.

An additional object of the present invention is to provide a molding apparatus which includes an extruder for the purpose of kneading a mixture of a polymer and a cross-linking agent, a reaction chamber for the purpose of effecting the cross-linking reaction by applying a temperature and a pressure higher than the temperature and the pressure within said extruder, and a molding head.

Yet another object of the present invention is to provide a molding apparatus equipped with plural reaction chambers for the purpose of alternately receiving the kneaded molten mixture consisting of the polymer and the cross-linking agent from an extruder and effecting the cross-linking reaction by applying a temperature and a pressure higher than the temperature and the pressure employed in the extruder and a molding head for the purpose of receiving the cross-linked high polymer from said reaction chamber and molding it into molded products, thereby rendering it possible to produce molded products from said cross-linked high polymer continuously.

BRIEF DESCRIPTION OF THE DRAWINGS

Referring to the appended drawings:

FIGS. 8A, 8B and 8C are diagrammatic illustrations of the positions of the parts of the embodiment of FIG. 7, at various stages of its operation.

DETAILED DESCRIPTION OF THE INVENTION

Figure 1:
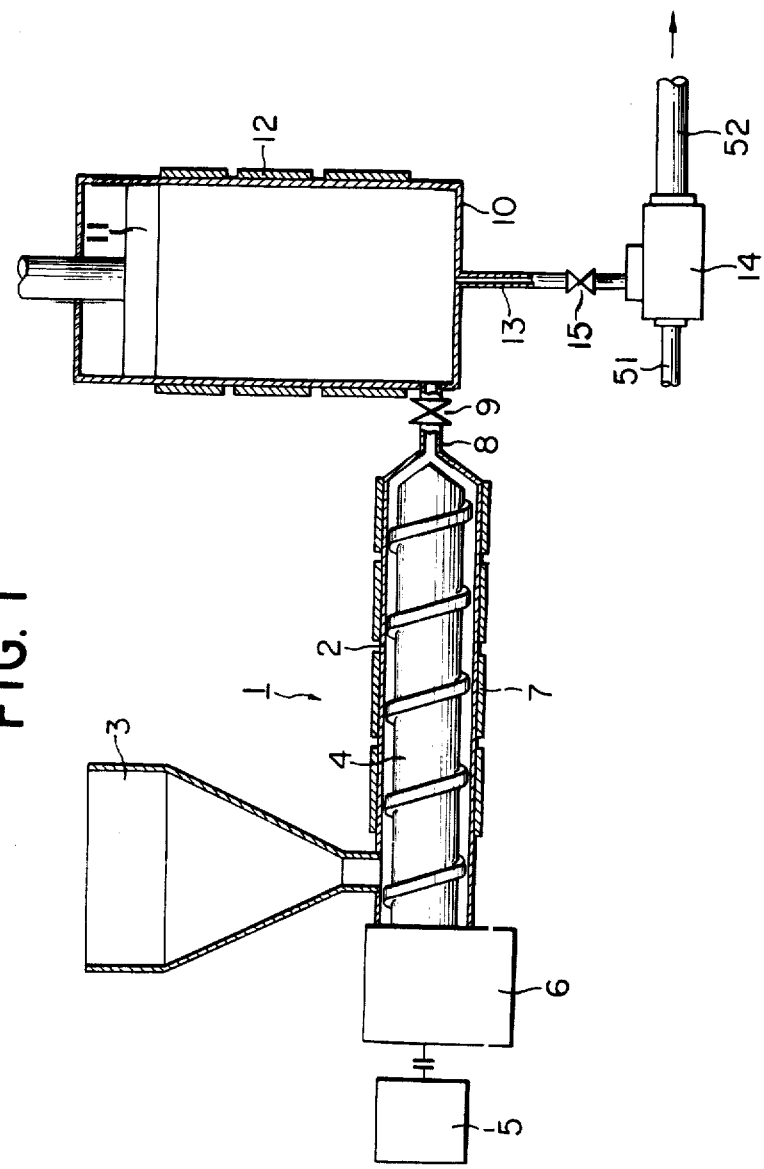
FIG. 1 is a schematic longitudinal cross-sectional view of an examplary embodiment of the present invention.

In FIG. 1, the reference numeral 1 denotes an extruder, which is composed of a barrel 2 having a hopper 3 mounted thereon, a screw 4 inside the barrel 2 and driven by a motor 5 through a reduction gear 6, a heater 7 surrounding the barrel 2, and an outlet tube 8 provided on the tip of the barrel 2 and equipped with a transfer valve 9.

The outlet tube 8 is connected with the side wall of a reaction chamber 10 so as to communicate with said chamber. The reaction chamber 10 is provided with a plunger 11 which is fitted in said chamber so as to slide along the interior wall thereof. The outside of the reaction chamber 10 is surrounded by a heater 12.

The reaction chamber 10 is connected with one end of an outlet tube 13 whose opposite end is connected with a cross head or die 14. A throttle valve to control the pressure or a transfer valve having a throttling function, denoted by the numeral reference 15, is installed in the middle of the outlet tube 13.

In FIGS. 2, 3 and 4A – 4F, 21 denotes the extruder, and this extruder 21 is provided with a barrel 22, hopper 23, screw 24, motor 25, reduction gear 26, outlet tube 28 and valve 29, like the extruder shown in FIG. 1. The outlet tube 28 constitutes a resin receiver equipped with the pressure gauge 36 which is used to control the motor 25.

The outlet tube or resin receiver 28 is connected with a casing 37. A pair of reaction chambers 30, 30' extend from this casing 37. The upper ends of the reaction chambers 30, 30' constitute oil cylinders 38, 38' provided with plungers 31, 31' fitted therein in slidable fashion, and the lower parts thereof are surrounded by the heaters 32, 32'. The bottoms of the reaction chambers 30, 30' are provided with inlet passages 39, 39' and outlet passages 33, 33' for the resin.

The casing 37 is provided with parallel passages 40, 40'; 41, 41' interconnecting with the foregoing passages 39, 39'; 33, 33', respectively. A hole coaxial with the screw 24 penetrates the casing 37. Further on the opposite side of the casing 37 from the reaction chambers 30, 30', there is installed a cross head or die 34. Said penetrating hole is provided with a rotatable transfer valve structure which is controlled by an electric or oil-pressure type controller 47. This transfer valve structure consists of a valve portion 29 which functions to open and close the passages connecting the resin receiver 28 with the passages 40, 40' and a valve portion 35 which functions to open and close the passages 41, 41' connecting the reaction chambers 30, 30' with the die 34. These valve portions 29 and 35 are operated simultaneously by means of the controller 47.

The valve portion 29 is provided with an axial hole 43 which constantly communicates with the resin receiver 28 and with radial passages 42, 42' which communicate with the axial hole 43 and also are connected with the passages 39, 39' of the reaction chambers 30, 30' at regular intervals of time. The valve portion 35 is provided with projections 44, 44', and these projections 44, 44' slidably contact the inside wall of said penetrating hole. The zones between these projections 44, 44' form the passages which selectively connects the passages 41, 41' with the passage 45. The reference numerals 48, 49 and 50 denote heaters for the casing 37 and the die 34.

The method of molding will be outlined in the following by reference to the apparatus shown in FIG. 1.

A mixture was prepared in advance by adding 1.25 parts by weight of dicumyl peroxide and 0.5 part by weight of an antioxidant to 100 parts by weight of the aforementioned low-density polyethylene and uniformly mixing same therein. This mixture was fed to the barrel 2 of the extruder 1 by means of the hopper 3, and was melted and kneaded under the conditions of a temperature of 130°C and a pressure of 100 Kg/cm² by means of the screw 4. The resulting molten mixture was fed into the reaction chamber 10 and was subjected to a pressure of 5,000 Kg/cm² therein by means of the plunger 11 after closing the transfer valve 9. The transfer valve 15 was closed to make sure that the molten mixture can be compressed by said pressure in the reaction chamber 10. The temperature of the mixture inside the reaction chamber 10 was raised to 180°C, whereby there was obtained a cross-linked high polymer with a gel content of 96 percent in about 20 seconds. Subsequently, the thus processed polymer was extruded through the die 14 while being formed into a coating layer 52 covering a cable 51 and was then cooled by air at room temperature to form a hardened coating layer, whereby there was obtained a cable covered with a cross-linked high polymer.

When this molding is performed by the conventional high-pressure steam method, it is required to cure the coating layer for about 20 minutes within a vulcanizing tube, using steam at a pressure of 20 Kg/cm² and a temperature of 211.4°C.

Figure 2:
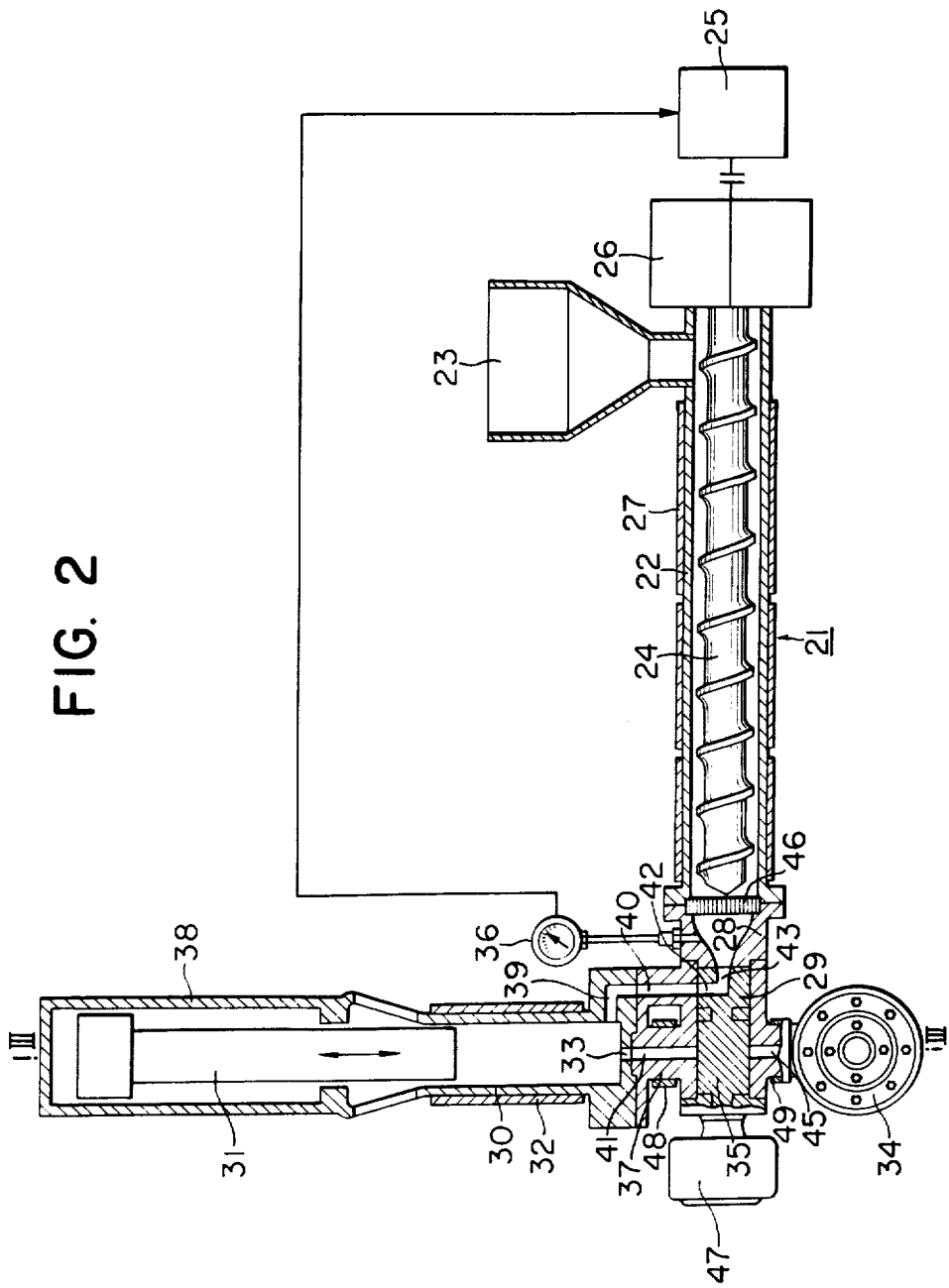
FIG. 2 is a schematic longitudinal cross-sectional view of another embodiment of the present invention.
Figure 3:
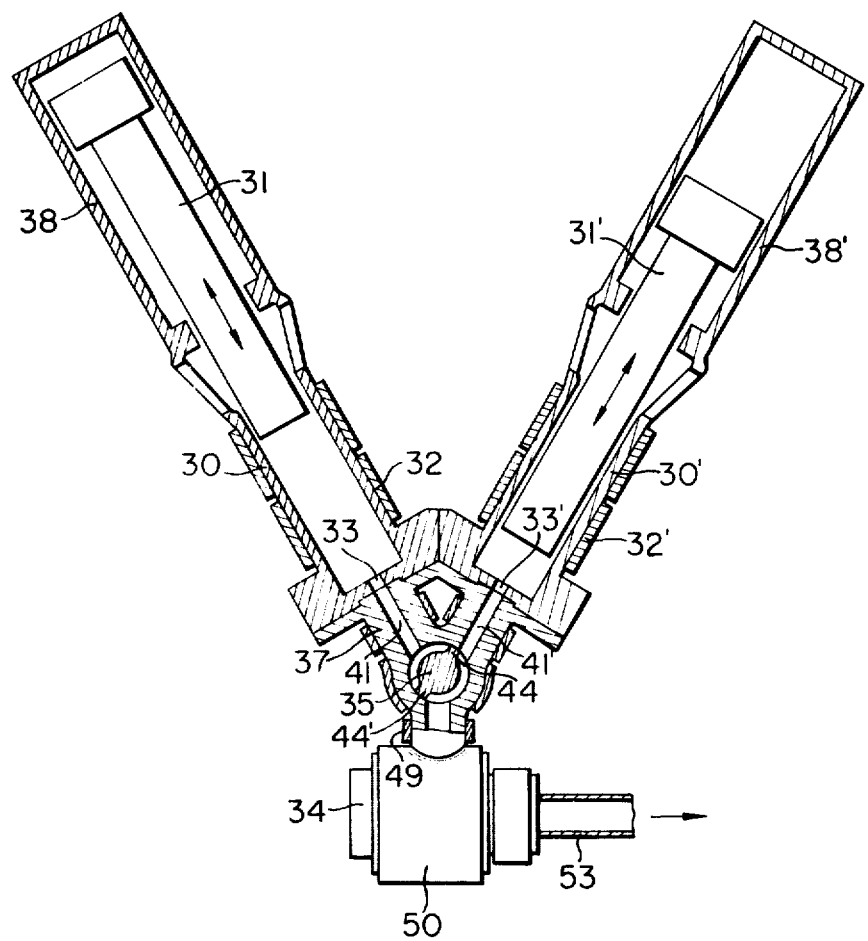
FIG. 3 is a cross-sectional view taken along the line III—III in FIG. 2.
Figure 4A:
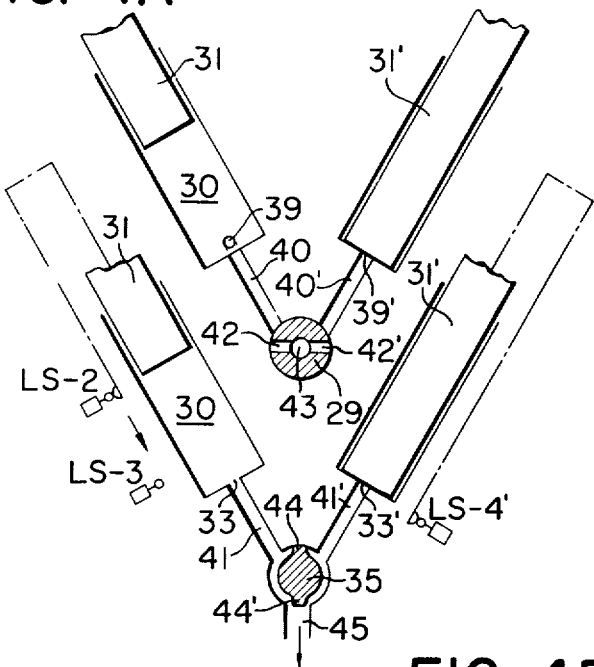
FIGS. 4A, 4B, 4C, 4D, 4E and 4F are diagrammatic illustrations of the positions of the valves at the various stages of operation of the apparatus exemplified in FIG. 2.
Figure 4B:
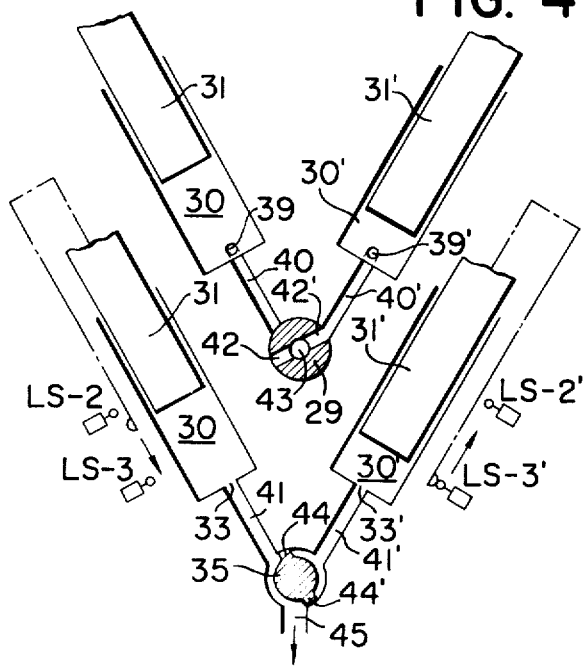
Figure 4C:
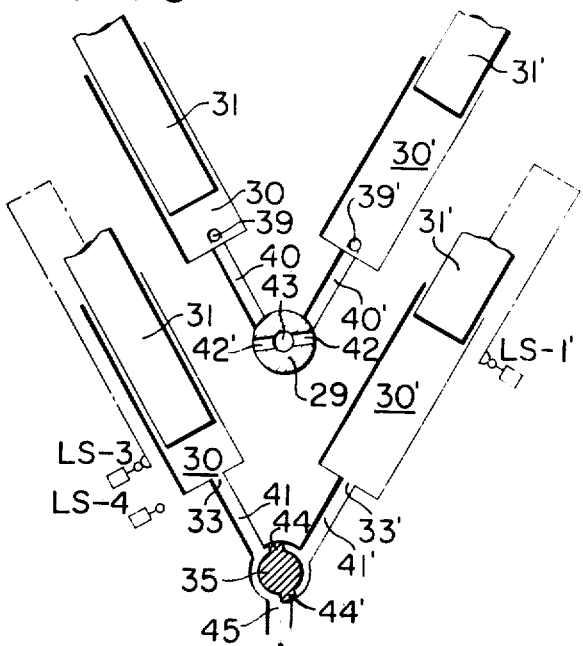
Figure 4D:
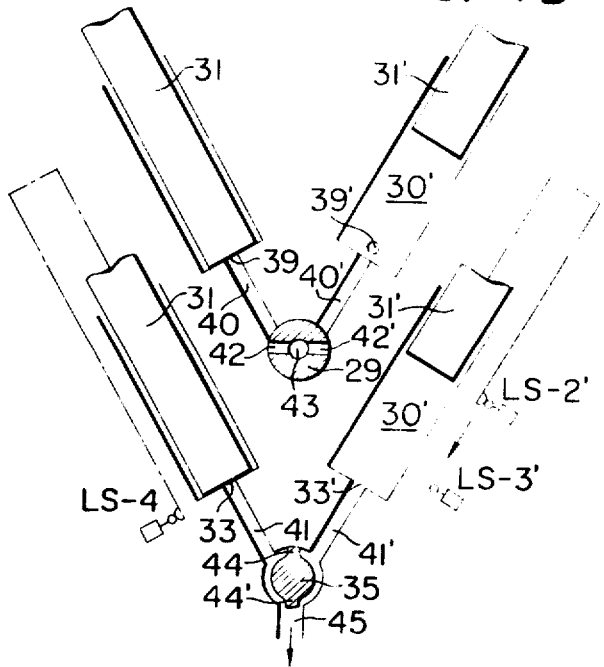
Figure 4E:
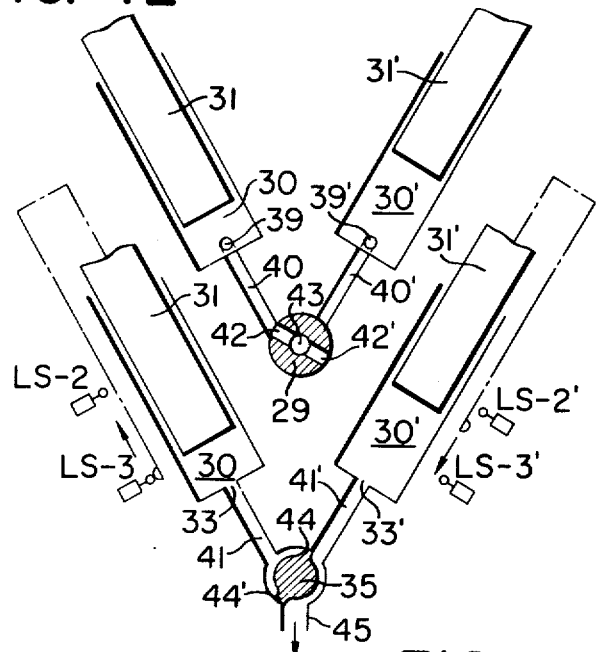
Figure 4F:
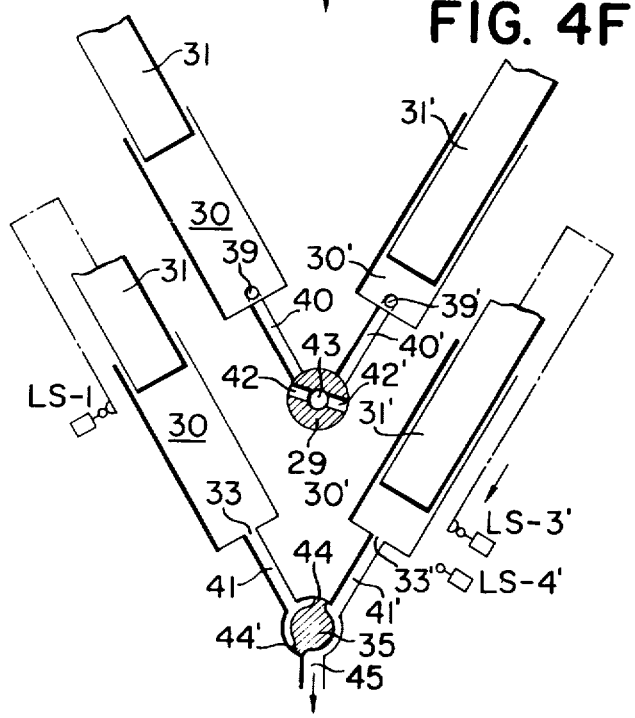

The method of the present invention as above, however, is preferably practiced by employing an apparatus as shown in FIGS. 2 - 4. A detailed explanation of the operation of said apparatus is as follows.

The molten mixture extruded into the resin receiver 28 through the breaker plate 46 is sent into the reaction chamber 30 through the passages 43, 42, 40 and 39 by appropriately positioning the transfer valve portion 29 by the controller 47. When the reaction chamber 30 becomes full of the mixture, the internal pressure of the resin receiver 28 rises, and, when a prescribed internal pressure is attained, the pressure gauge 36 functions to stop the motor 25 and the rotation of the screw 24 stops. The mixture fed into the reaction chamber 30 is therein subjected to an appropriate temperature and pressure required for effecting the cross-linking reaction such as mentioned above, and the thus reacted mixture is then extruded from the die 34 after flowing through the passages 33, 41 and 45 by properly positioning the transfer valve portion 35. In FIG. 3, 53 denotes the molding thus molded. This is hardened subsequently by cooling at room temperature.

Next, the inter-relation of the transfer valves 29 and 35 and the plungers 31 and 31' will be explained by reference to FIGS. 4 and 5.

The reaction chambers 30 and 30' are each provided with 4 limit switches, namely, LS-1, 2, 3, 4 and LS-1', 2', 3', 4', for the purpose of controlling the working of the plungers 31 and 31'.

Referring to FIG. 4 (A), the transfer valve 29 has closed both passages 40 and 40' and the mixture has filled up the resin receiver 28 to stop the extruder 1, while the other transfer valve 35 is located at a neutral position and both passages 41 and 41' are open.

The plunger 31 has already begun to move forward, is engaged with the limit switch LS-2, and is about to shift to a steady speed forward movement, while the plunger 31' on the other hand has already completed its forward movement, is engaged with the limit switch LS-4', and is about to shift to its backward movement. Consequently, the cross-linked high polymer stocked in the reaction chamber 30 is continuously supplied to the die 34 through the passages 41 and 45.

Referring to FIG. 4 (B), subsequent to the stage shown in the foregoing FIG. 4 (A), the transfer valve portions 29 and 35 shift, the transfer valve portion 29 opens the passage 40' while leaving the passage 40 closed, the plunger 31' starts moving backward rapidly so that the mixture stocked in the resin receiver 28 is sent in the reaction chamber 30' and, at the same time, the extruder 1 works. Simultaneously, the other transfer valve portion 35 closes the passage 41' while leaving the passage 41 open, so that the high polymer stocked in the reaction chamber 30 is continuously supplied to the die 34.

FIG. 4 (C) shows the working state of the apparatus after the passage of time $t_2+t_3$ (cf. FIG. 5) subsequent to the process shown in the foregoing FIG. 4 (A). That is, the transfer valve portions 29 and 35 shift, the transfer valve 29 closes both passages 40 and 40', the resin receiver 28 is filled with the mixture and the extruder stops. Meanwhile, the other transfer valve portion 35 opens the passage 41 while leaving the passage 41' closed. The plunger 31 making a steady forward movement has been engaged with the limit switch LS-3 and is about to shift to a decelerated forward movement, whereby the high polymer stocked in the reaction chamber 30 is extruded continuously, while the other plunger 31' rapidly returns in the period of $t_2$ to engage the limit switch LS-1' and stop then and there, and, during the time $t_3$ subsequent thereto, the high polymer stocked in the reaction chamber 30' completes the cross-linking reaction by virtue of the pressure of the plunger 31'.

FIG. 4 (D) shows the working state of the apparatus after the lapse of time $t'$ subsequent to the process shown in the foregoing FIG. 4 (C). That is, the extruder 1 is stopped, the transfer valve portions 29 and 35 shift and the transfer valve portion 29 closes both passages 40 and 40', while the other transfer valve portion 35 is located at a neutral position wherein both passages 41 and 41' are open. The plunger 31 has already completed its forward movement, is engaged with the limit switch LS-4 and is about to shift to its backward movement, while the other plunger 31' has already begun to move forward, is engaged with the limit switch LS-2' and is about to shift to steady forward movement. Consequently, the cross-linked high polymer stocked in the reaction chamber 30' is supplied to the die 34 through the passages 41 and 45.

Referring to FIG. 4 (E), subsequent to the process shown in the foregoing FIG. 4 (D), the transfer valve portions 29 and 35 work and the transfer valve portion 29 opens the passage 40 while closing the passage 40'. The plunger 31 starts moving backward rapidly, so that the mixture stocked in the resin receiver 28 is sent in the reaction chamber 30 and, at the same time, the extruder 1 works. Meanwhile, the other transfer valve portion 35 closes the passage 41 while leaving the passage 41' open, so that the high polymer stocked in the reaction chamber 30' is continuously supplied to the die 34.

FIG. 4 (F) shows the working state of the apparatus after the lapse of time $t_2$, $+136$ $t_3$, (cf. FIG. 5) subsequent to the process shown in the foregoing FIG. 4 (E). That is, the transfer valve portions 29 and 35 shift, the transfer valve portion 29 closes both passages 40 and 40', the resin receiver 28 is filled with the mixture and the extruder stops. Meanwhile, the other transfer valve portion 35 opens the passage 41' while leaving the passage 41 closed. The plunger 31' making a steady forward movement has been engaged with the limit switch LS-3 and is about to shift to a decelerated forward movement, whereby the high polymer stocked in the reaction chamber 30' is extruded continuously, while the other plunger 31 rapidly returns in the period of $t'_2$ to be engaged with the limit switch LS-1 and stop then and there, and, during the time $t'_3$ subsequent thereto, the high polymer stocked in the reaction chamber 30 completes the cross-linking reaction by virtue of the pressure of the plunger 31.

Figure 5:
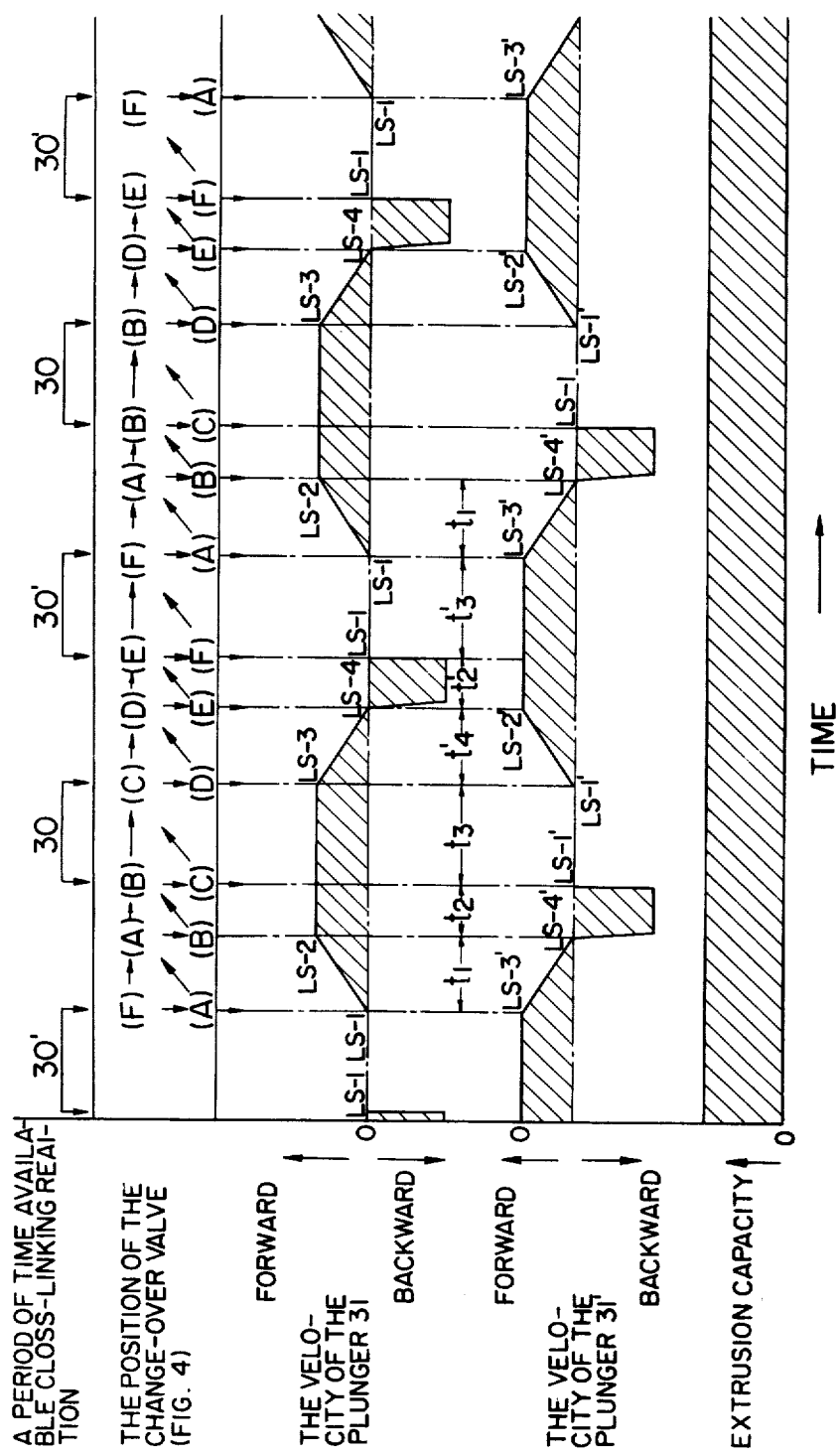
FIG. 5 is a diagrammatic representation showing the relation between the operation of the plunger and the amount of the polymer that is extruded.

The relation between the flow velocity, the cycles of the plungers 31 and 31' within the reaction chambers 30 and 30' and the positions of the transfer valves 29 and 35 is as diagrammatically shown in FIG. 5, wherein the time required for one cycle of a plunger is $t_1 - t_3$ or $t'_1 - t'_3$ and, accordingly, the time required for one cycle of the entire apparatus is $t_1 - t'_3$, the time required for the cross-linking reaction is $t_3$ and $t'_3$ for the reaction chamber 30 and the reaction chamber 30', respectively. The present apparatus can produce the continuous moldings 53 by means of the die 34 through successive repetition of the foregoing cycle, and this is of course attributable to the fact that the amount of the high polymer being extruded from both reaction chambers 30 and 30' into the die 34 is uniform as shown in FIG. 5.

Figure 6:
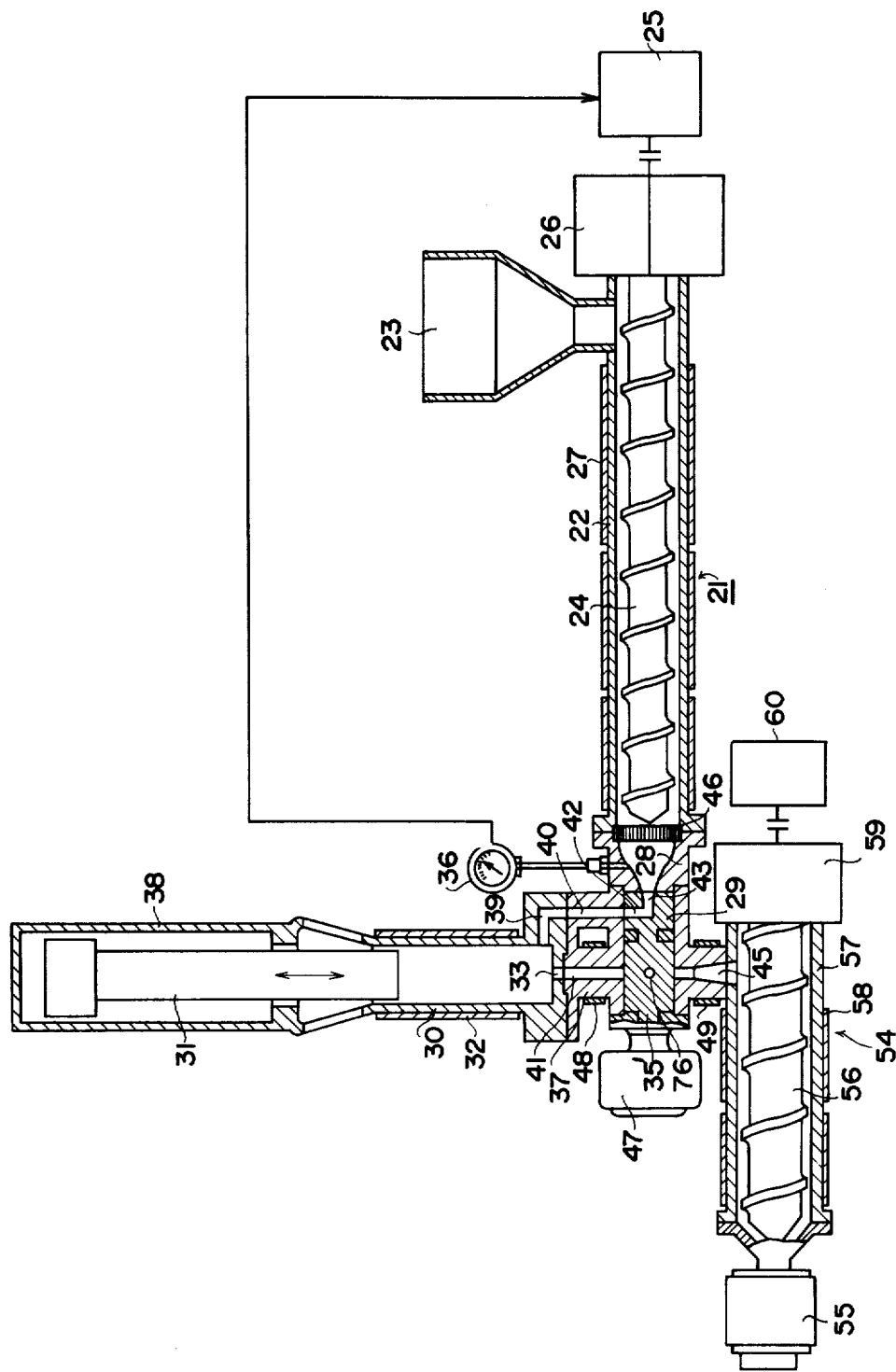
FIG. 6 is a schematic longitudinal cross-sectional view of a further embodiment of the invention.
Figure 7:
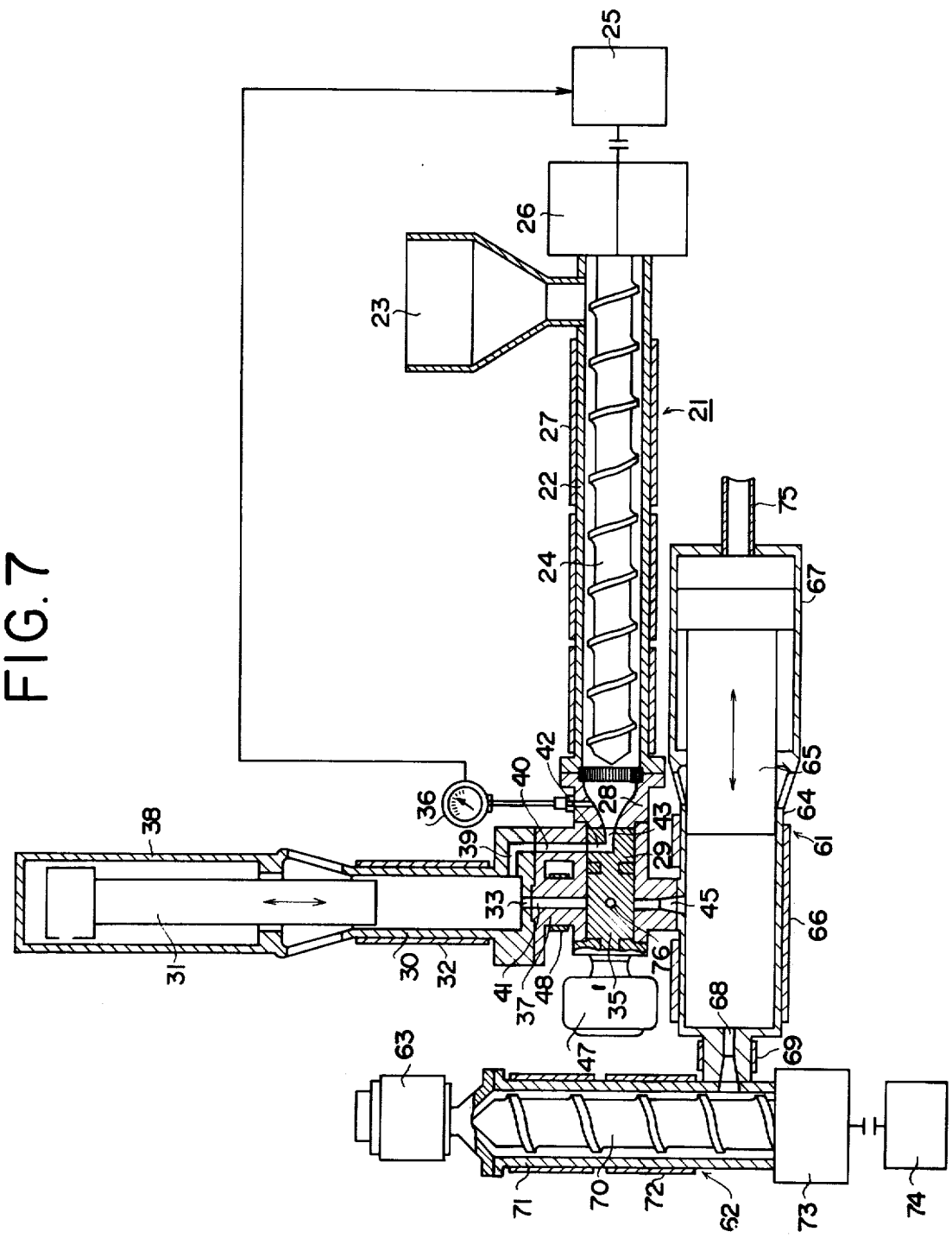
FIG. 7 is a schematic longitudinal cross-sectional view of still another embodiment of the invention.

FIGS. 6 and 7 illustrate respectively further embodiments of the present invention. These embodiments are generally similar to the embodiment of FIG. 2, except that they employ different devices instead of the die 34 shown in FIG. 2. Accordingly, the parts of these further embodiments that are identical with those of the embodiment shown in FIG. 2 are denoted by the same reference numerals. The parts that are different from those of the embodiment of FIG. 2 are denoted by different reference numerals. The following description will refer only to the parts which are different from those of the embodiment of FIG. 2.

In FIGS. 6 and 7, there is employed a single reaction chamber 30 and a modified valve 35' having a single passage 76. It is apparent, however, that these embodiments can employ two reaction chambers 30, 30' and the valve 35 of FIG. 2, if desired.

In FIG. 6, the reference numeral 54 denotes a further extruder comprising a barrel 57 which is connected with the casing 37.

On the wall of the barrel 57 there is provided an opening which communicates with the passage 45 of the casing 37. Inside the barrel 57 there is provided a screw 56 which is driven by a motor 60 through a reduction gear 59. Further, a heater 58 is disposed around the outer periphery of the barrel 57 and a die 55 is attached at the discharge end of the barrel 57.

In FIG. 7, the reference numeral 61 denotes an accumulator including a cylinder 64 which is connected with the casing 37.

The cylinder 64 is provided on the wall thereof with an opening which communicates with the passage 45 of the casing 37. A plunger 65 is slideably disposed inside of the cylinder 64. One end of an oil supply pipe 75 is connected to cover plate of the cylinder 64 adjacent to the head of the plunger 65, and the other end thereof is connected to an oil pressure apparatus, not shown, in order that pressurized oil can be fed into the cylinder 64. The head of the plunger 65 is thereby continuously pressurized by the oil so that a predetermined pressure is constantly maintained thereon. Heaters 66 and 69 are disposed around the periphery of the cylinder 64 and about the outlet portion of the cylinder 64. The valve member 35' is provided with a passage 76 adapted to open and close the passages 41 and 45.

The reference numeral 62 denotes a further extruder including a barrel 71 which is connected to the outlet end of the cylinder 64. The barrel 71 is provided on the wall thereof with an opening adapted to communicate with the discharge passage 68 of the cylinder 64. Inside of the barrel 71 there is provided a screw 70 that is driven by a motor through a reduction gear 73. A heater 72 is also disposed around the periphery of the barrel 71. A die 63 is attached at the discharge end of the barrel 71.

During operation of the apparatus having such a structure as above-mentioned, the resin is melted and kneaded within the extruder 21 in a similar manner as in the apparatus shown in FIG. 2. It is introduced into the reaction chamber 30, and then, when the resin pressure within the resin receiver 28 rises up to the predetermined pressure, the pressure gauge 36 stops the motor 25 so as to stop rotation of the screw 24. Once the rotation of the screw 24 is stopped, the transfer valve works to govern opening and closing of the passages 40 and 42 communicating the resin receiver 28 with the reaction chamber 30, as well as the passages 41 and 45 communicating the reaction chamber 30 with the accumulater 61 alternately as described later on, by means of its two valve mechanisms of different type that are defined on a single shaft thereof and adapted to operate in sequence together with the plunger 31.

The resin that has completed its cross-linking reaction within the reaction chamber 30 is pushed out by the plunger 31 and the operation of the transfer valve 35 allows same to flow through the passages 33 and 45 so as to be fed into the accumulator 61.

Since a constant pressure is always maintained within the accumulator 61 by means of the plunger 65 as above-mentioned, the resin that is intermittently pushed out from the reaction chamber 30 after completion of the cross-linking reaction thereof is caused to be fed into the extruder 62 through the accumulator 61.

The molten resin fed into the accumulator 61 is transfered into the extruder 62 by flowing through the passage 68 under a constant pressure and then extruded from the die 63.

Now, in reference to FIGS. 8A, 8B, and 8C, a detailed description will be given hereinunder with regard to the operation of the transfer valve 35 and the plunger 31 of the reaction chamber 30.

The operation of the transfer valve 35 has three phases, i.e., the first, second and third phases. When the transfer valve 35 is in the first phase as shown in FIG. 8A, the main extruder 21 is operating and thereby the molten resin is being fed from the main extruder 21 to the reaction chamber 30 through the passages 43, 40 and 39, and on the other hand the passages 41 and 45 communicating the reaction chamber with the accumulator 61 are closed by placing teh passage 76 transversely.

Next, when the transfer valve 35 is in the second phase as shown in FIG. 8B, the main extruder 21 is stopped and the passage 40 leading to the reaction chamber 30 is closed, but, on the other hand, the molten resin is undergoing the cross-linking reaction in the chamber 30 by being pressurized by the plunger 31.

Next, the transfer valve is turned to its third phase as shown in FIG. 8C. In this phase the main extruder 21 is stopped and the passage 40 is also closed, while the resin that has completed the cross-linking reaction is being pushed out from the reaction chamber 30 into the accumulator 61 by operation of the plunger 31.

It is in such a way as above-mentioned that a single cycle of operation of the plunger 31 of the reaction chamber 30 and the transfer valve is completed.

Because of the provision of a reaction chamber in which there is applied on the resin mixture a higher temperature and pressure than is applied in the main extruder 21, both of which are essential for cross-linking reaction, in addition to a transfer valve which operates in sequence with the plunger in said reaction chamber, this apparatus can achieve intermittent and very rapid operation for the cross-linking reaction of the resin, followed by molding. The further provision of an accumulator and a sub-accumulator makes it feasible to manufacture molded products of well cross-linked resin in succession under stabilized conditions.

Although particular preferred embodiments of the invention have been disclosed hereinabove for the purpose of illustration, it will be understood that variations or modifications thereof which lie within the scope of the invention as defined by the appended claims are fully contemplated.

The embodiments of the invention in which an exclusive property or privilege is claimed are defined as follows:

1. A high-pressure fluid cross-linking molding apparatus for molding polymers, comprising:

extruder means for melting and kneading a mixture composed of a polymer and a cross-linking agent by applying such temperature and pressure as will not give rise to a cross-linking reaction;

a plurality of reaction units each having a reaction compartment and relatively movable reaction plunger therein, each said reaction compartment being adapted to receive therein the molten mixture from said extruder means, and said reaction unit each having means associated therewith for applying a higher temperature and pressure on said mixture than is applied by said extruder means for causing a cross-linking reaction to occur when said mixture is located within said reaction compartment;

first passageway means providing communication between the discharge end of said extruder means and said reaction compartments, said first passageway means including a plurality of first passageways connecting and providing communication between each of said reaction compartments and the discharge end of said extruder means;

a molding head assembly adapted for molding the cross-linked polymer;

second passageway means providing communication between said reaction compartments and said molding head assembly, said second passageway means including a plurality of second passageways connected to and providing communication between each of said reaction compartments and said molding head assembly;

transfer valve means associated with said first and second passageways for alternately opening and closing said first and second passageways to provide for the continuous flow from said reaction compartments to said molding head assembly while permitting intermittent and alternating flow from said extruder means to each of said reaction compartments;

said transfer valve means including a shiftable valve member movable between first and second positions, said valve member when in said first position providing communication between said extruder means and one of said reaction compartments while isolating the other reaction compartment from said extruder means, said other reaction compartment being connected in communication with said molding head assembly when said valve member is in said first position;

said valve member when in said second position providing direct communication between said other reaction compartment and said extruder means while isolating said one reaction compartment from said extruder means, said one reaction compartment being in communication with said molding head assembly when said valve member is in said second position; and said valve member when being shifted between said first and second positions totally disconnecting all of said reaction compartments from said extruder means, said valve member when being shifted between said first and second positions, at least when in an intermediate location disposed between said first and second positions, resulting in all of said reaction compartments being in communication with said molding head assembly.

2. An apparatus according to claim 1, wherein said valve member comprises a single movable member coacting with all of said first and second passageways for controlling the flow therethrough.

3. An apparatus according to claim 2, wherein said single movable member is angularly movable between said first and second positions.

4. An apparatus according to claim 1, wherein said extruder means includes a rotatable plasticizing member and drive means connected thereto for rotatably driving same, and control means for disconnecting said drive means so as to stop the rotation of said plasticizing member whenever all of said first passageways are closed by said valve member.

5. An apparatus according to claim 4, wherein said control means includes pressure responsive means operatively associated with the discharge end of said extruder means for deenergizing said drive means when the pressure within said extruder means exceeds a preselected level.

6. An apparatus according to claim 5, wherein said extruder means comprises a single extruder having a rotatable plasticizing screw associated therewith.

7. A high-pressure fluid cross-linking molding apparatus for molding polymers, comprising:

first extruder means for melting and kneading a mixture composed of a polymer and a cross-linking agent by applying such temperature and pressure as will not give rise to a cross-linking reaction;

a reaction unit having a reaction chamber adapted to receive therein the mixture from the extruder means and a relatively movable reaction plunger associated therewith, said reaction unit having means associated therewith for applying a temperature and a pressure on said mixture which is higher than the internal temperature and pressure developed within the extruder means so as to cause a cross-linking reaction to occur when the molten mixture is contained within the reaction compartment;

a first passageway providing communication between the discharge end of said extruder means and said reaction compartment for permitting flow of molten mixture from said extruder means to said reaction compartment;

second extruder means for receiving therein the molten mixture after occurrence of the cross-linking reaction;

a second passageway providing communication between said reaction compartment and said second extruder means for permitting the mixture, after the cross-linking reaction has occurred, to be transferred from said reaction compartment to said second extruder means;

a molding head assembly for permitting discharge therefrom of the cross-linked polymer, and a third passageway providing communication between said molding head assembly and the discharge end of said second extruder means; and transfer valve means associated with said first and second passageways for alternately opening and closing said first and second passageways to provide for the intermittent and alternating flow between (1) said first extruder means and said reaction compartment and (2) said reaction compartment and said second extruder means.

8. An apparatus according to claim 7, wherein each of said first and second extruder means includes a rotatable extruder member, and further including accumulator means connected between said reaction unit and said second extruder means, said accumulator means including an accumulation chamber connected to said second passageway and means associated with said accumulator chamber for applying a constant pressure on the cross-linked polymer disposed within said chamber for permitting a continuous flow of said polymer from said accumulation chamber into said second extruder means for supply to said molding head assembly.

* * * * *